Figure 1:
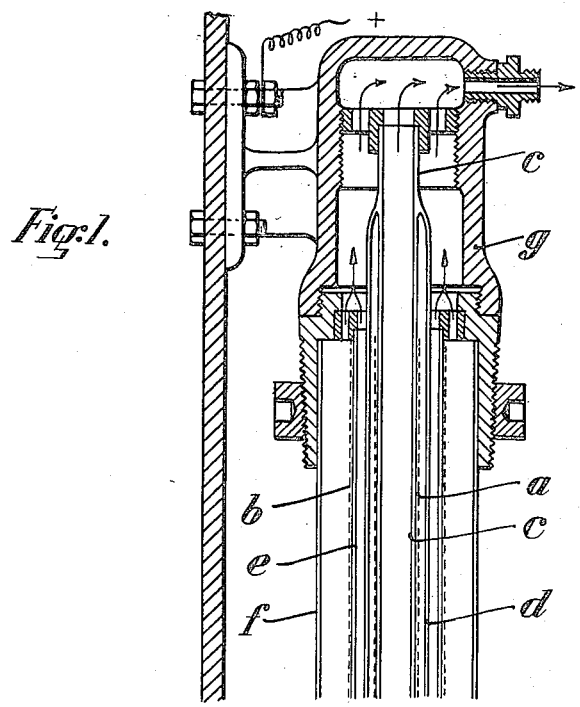
Figure 1:
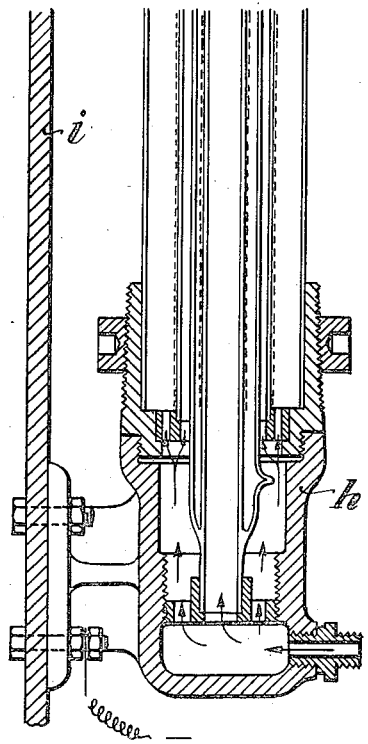

Patented May 8, 1923.

1,454,219

UNITED STATES PATENT OFFICE.

RICHARD GOEDICKE, OF BERLIN-SCHONEBERG, GERMANY.

OZONE-GENERATING APPARATUS.

Application filed February 28, 1920. Serial No. 362,165.

*To all whom it may concern:*

Be it known that I, RICHARD GOEDICKE, a citizen of the German Republic, and resident of Berlin-Schoneberg, in the German Republic, have invented a certain new and Improved Ozone-Generating Apparatus, of which the following is a specification.

To produce ozone, apparatus have already been devised which are provided with annular or tubular electrodes located concentrically one within the other, the air to be ozonized being led through the interstice between the two electrodes and ozone being generated by the electric discharges formed between the electrodes.

Experience has shown that the temperature of the air led through said interstice plays an important rôle. If its temperature is comparatively high, the generation of the ozone is not only greatly impeded, but the ozone molecules formed decompose again which entails the necessity of cooling the ozone generator in order to obtain as great an output as possible. This has been effected hitherto by conducting water through the innermost space of the apparatus, whereby a very strong cooling was obtained.

This mode of proceeding, however, involves the risk that the operator might forget to either turn the water on or off. In the former case the apparatus gets soon destroyed because the glass is punctured by the discharges, whereas in the latter case the consumption of water is unduly great.

Furthermore, the connection between the ozone generator and the water supply may get leaky.

All these drawbacks are overcome by my present invention, the gist of which consists in substituting cooling by air for cooling by water, the air however being led not only through the innermost space of the apparatus, but also through an outer annular space formed by the outer electrode and a glass tube surrounding this electrode at a suitable distance. Thus, the inner electrode is cooled from inside, the outer one from outside.

Another advantage obtained by this means resides in the fact, that ozone will now be formed also in the cooling air inasmuch, as the electric discharges exert their influence not only in the gap between the electrodes, but also at the other side of each electrode where the cooling air passes along. The amount of ozone produced is thus greater.

Further, to reduce, especially with larger apparatus, the consumption of electric current, I have devised a special form of construction of the ozone generator, in which the cooling air after having been ozonized to a certain measure is repeatedly led through the apparatus, or is made to circulate therein. If the air passes but once through the apparatus, the ozone generated in the cooling air will exert its effect but once and will then be lost. In order to obviate this loss, the ozonized air is mixed in the special form of apparatus just mentioned with the liquid to be purified and this mixture is conducted through the inner space of the apparatus which is cooled thereby. The air and the liquid separate again in a vessel connected to said inner space and the ozonized air is led once more through the apparatus in order to be ozonized anew and so on.

By this means a greater percentage of ozone is formed in the air to be mixed with the liquid, which entails a correspondingly greater purifying effect, and, besides, the consumption of electric current is diminished because it is not necessary to ozonize the air so strongly as owing to the repeated passage of the air through the apparatus, the air is enriched by and by with ozone up to the highest possible degree.

Figure 2:
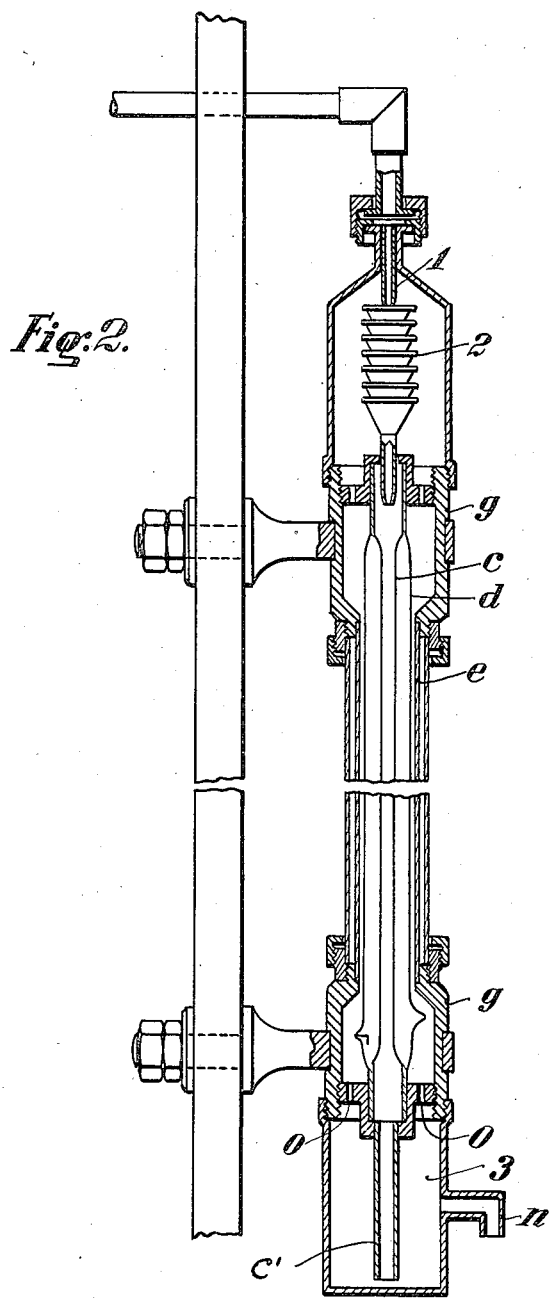

In order to make my invention more clear, I refer to the accompanying drawing, in which similar letters of reference denote similar parts throughout the several views, and in which:

Fig. 1 is a vertical section of an ozonizing apparatus constructed according to my invention and Fig. 2 is a vertical section of another form of construction.

Referring to Fig. 1, $a$ and $b$ are tubular metal electrodes, $a$ being positioned concentrically within $b$. The electrode $a$ is supported by a tube $c$ consisting of glass or another suitable material. The metallic electrode is surrounded by a glass tube $d$ connected at its ends to the tube $c$ by melting or the like. The outer electrode $b$ is supported by a tube $e$ of glass or the like. The whole is enclosed in a tube $f$ provided at its ends with fittings $g$ and $h$ of such a construction that three air passages are formed, viz, one, through the interior of the tube $a$; a second one, through the gap between the two electrodes; and a third, through the gap between the tube $f$ and the outer electrode $b$. The air is conducted into the lower fitting $h$, is there subdivided to form three separate currents, and is collected again in the upper fitting $g$; the direction of flow may however be reversed.

The fittings may have any suitable means for attaching the apparatus to the wall $i$ or to any other support. The fittings are inserted in the electric circuit. The air is pressed or sucked through the passages mentioned by any suitable device, such as a pump, a blower, a ventilator, or the like.

Referring to Fig. 2, in this form of construction there are provided only the innermost air passage and that between the electrodes. The liquid to be purified is introduced into the apparatus through a nozzle 1 provided at the top of the apparatus, the said nozzle terminating in an injector 2, into which the air is sucked, and within which it gets mixed with the liquid. The mixture of air and liquid flows through the innermost passage, i. e. through the tube $c$, and escapes through an elongation $c^1$ thereof into a vessel 3 in which the air and the liquid separate, the liquid escaping through the outlet $n$ whereas the ozonized air passes through apparatus $o$ back into the outer passage in order to get again under the influence of the nozzle 1, i. e. to be mixed again with the liquid entering the injector 2. The air is thus kept in permanent circulation.

As the liquid which leaves the apparatus is likely to carry along small quantities of air, I prefer to provide at any suitable place a small aperture through which a comparatively small quantity of air may be sucked into the circle to make up for the air carried off by the liquid.

I claim:—

1. In an ozone generating apparatus, the combination, with concentric electrodes, of a tube enclosing them, fittings at the ends of said tube, means for supporting the electrodes and the said tube in said fittings, means for making air pass through the channels formed by the said electrodes, and means for making the air circulate through said channels.

2. In an ozone generating apparatus, the combination with concentric electrodes, of a vessel at one end and an injector at the other end of said electrodes and a passage connecting the air space of said vessel with said injector.

3. In an ozone generating apparatus, the combination, with concentric electrodes, of a vessel at one end of the electrodes, said inner electrode extending into said vessel, an injector at the other end of said electrodes, a casing around said injector and a passage connecting said casing with the air space of the said vessel.

In testimony whereof I have affixed my signature.

RICHARD GOEDICKE.